US012654343B2

(12) United States Patent
Cauble et al.

(10) Patent No.: US 12,654,343 B2
(45) Date of Patent: Jun. 16, 2026

(54) KNIFE ENCLOSURE

(71) Applicant: Big Country Concepts, LLC, Waxahachie, TX (US)

(72) Inventors: Robert Shawn Cauble, Waxahachie, TX (US); John Wesley Burnett, Waxahachie, TX (US)

( * ) Notice: Subject to any disclaimer, the term of this patent is extended or adjusted under 35 U.S.C. 154(b) by 1025 days.

(21) Appl. No.: 17/663,822

(22) Filed: May 17, 2022

(65) Prior Publication Data

US 2022/0362952 A1 Nov. 17, 2022

Related U.S. Application Data

(60) Provisional application No. 63/189,396, filed on May 17, 2021.

(51) Int. Cl.
*B26B 5/00* (2006.01)

(52) U.S. Cl.
CPC .................................... *B26B 5/003* (2013.01)

(58) Field of Classification Search
CPC ........... B26B 5/00; B26B 5/003; B26B 29/00; B26B 29/02; B26B 29/04; B26B 29/06–063
See application file for complete search history.

(56) References Cited

U.S. PATENT DOCUMENTS 985,089 A * 2/1911 Winn ...................... B26B 21/16 30/526
1,431,487 A * 10/1922 Puke ........................ A22B 3/10 224/233
1,475,907 A * 11/1923 Volman ............... F16B 37/0864 279/7
1,812,302 A * 6/1931 Nies ...................... B26B 29/025 224/233
2,605,545 A * 8/1952 Weems ..................... B26B 5/00 220/829
2,624,939 A * 1/1953 Tveit ......................... B26B 1/04 30/161
2,784,888 A * 3/1957 Lecanu-Deschamps .................... B60R 9/058 224/330
3,913,735 A * 10/1975 Durbin ................... B65D 85/02 206/397
4,109,380 A * 8/1978 Anderson ................. B26B 5/00 30/162
4,415,080 A * 11/1983 Romine ................. B65D 85/62 206/349
4,462,731 A * 7/1984 Rovinsky ............ F16B 37/0892 411/433
4,784,263 A * 11/1988 Stanley .................. B65D 85/02 206/349

(Continued)

*Primary Examiner* — Ghassem Alie
*Assistant Examiner* — Richard D Crosby, Jr.
(74) *Attorney, Agent, or Firm* — Shannon Warren

(57) ABSTRACT

A blade enclosure selectively releases and secures first and second shell portions together using a fastener. The enclosure includes a shell formed by the first and second shell portions, the fastener, and a blade cavity defined as the space between the shell portions. The enclosure features a centerline extending from a first end to a second end. The fastener attaches along the centerline and includes a threaded shaft. The shell has a fastener socket divided partially in each shell portion, allowing the socket to receive the threaded shaft and hold the portions together in an assembled configuration.

11 Claims, 14 Drawing Sheets

(56) References Cited

U.S. PATENT DOCUMENTS 5,031,322 A * 7/1991 Jacoff .................... B26B 5/00 30/162
5,076,460 A * 12/1991 Hussell ................ B65D 43/164 16/257
5,078,266 A * 1/1992 Rackley ................ B23Q 13/00 206/349
5,099,578 A * 3/1992 Jan .................... B26B 5/001 30/162
D338,337 S * 8/1993 Roe, Jr. .................... D3/315
5,303,469 A * 4/1994 Yin-Han ................ B23D 51/01 30/2
5,581,890 A * 12/1996 Schmidt ................ B26B 5/003 30/162
5,661,908 A * 9/1997 Chen .................... B23D 51/03 30/519
5,864,952 A * 2/1999 Chung .................. B26B 5/001 30/162
5,875,551 A * 3/1999 Huang .................. B26B 5/00 30/162
5,909,930 A * 6/1999 Ragland, III ........... B26B 5/001 30/125
5,940,970 A * 8/1999 D'Ambro, Sr. ........... B26B 5/00 30/330
5,979,057 A * 11/1999 Chao .................... B26B 5/001 30/162
6,044,560 A * 4/2000 Chao .................... B26B 11/00 30/162
6,163,963 A * 12/2000 Huang .................. B26B 5/001 30/162
6,164,447 A * 12/2000 Svetlik ................ B23D 59/00 206/483
6,308,419 B1 * 10/2001 Neshat ................ B26B 29/025 30/286
6,317,986 B1 * 11/2001 Huang .................. B26B 5/001 30/162
6,324,762 B1 * 12/2001 Huang .................. B26B 11/00 7/165
6,449,850 B1 * 9/2002 Gilbert ................ B26B 5/001 30/162
6,568,087 B1 * 5/2003 Gringer ................ B23D 71/04 30/169
6,634,503 B2 * 10/2003 Welsh, Jr. ............. B26B 29/025 206/349
6,863,471 B2 * 3/2005 Medendorp .............. B25H 3/006 206/349
6,887,250 B1 * 5/2005 Dority ................ A61B 17/3213 30/305
6,951,055 B1 * 10/2005 Collins ................ B26B 1/048 30/162
6,971,178 B2 * 12/2005 Rowlay ................ B26B 5/001 30/162
7,388,149 B2 * 6/2008 Doherty ................ H02G 9/065 174/21 JS
7,434,684 B1 * 10/2008 Mabra .................. F42B 39/007 220/4.23
7,930,830 B2 * 4/2011 Gringer ................ B23D 79/10 30/294
8,683,641 B2 * 4/2014 Weinberger ......... A47J 37/0786 30/169
8,757,377 B2 * 6/2014 Alexander ......... B65D 73/0071 206/349
8,821,556 B2 * 9/2014 Brand .................. A61B 17/865 606/301
9,084,474 B2 * 7/2015 DPaola, Jr. ............ B44D 3/123
9,303,676 B2 * 4/2016 Oh ...................... F16B 2/065
9,316,245 B2 * 4/2016 Dvorak ................ F16B 37/0885
10,414,056 B2 * 9/2019 Lee .................... B26B 9/00
10,456,938 B2 * 10/2019 Wu .................... B26B 29/025
2003/0156922 A1 * 8/2003 Giehl .................. F16B 37/0864 411/432
2006/0080843 A1 * 4/2006 Gringer ................ B44D 3/164 30/172
2009/0108025 A1 * 4/2009 deVirag ................ G01F 11/086 222/391
2014/0069831 A1 * 3/2014 Miyawaki ............. B26B 29/025 206/349
2014/0284246 A1 * 9/2014 Huang .................. A47G 19/30 206/553
2019/0217491 A1 * 7/2019 Crain .................... B26B 1/10
2020/0056638 A1 * 2/2020 Bianchi ................ B25B 5/103
2021/0025415 A1 * 1/2021 Liao .................... F16B 2/12
2021/0047092 A1 * 2/2021 Taylor .................. A47G 21/14
2021/0062835 A1 * 3/2021 Saeter .................. F16B 2/065

* cited by examiner

KNIFE ENCLOSURE

CROSS-REFERENCE TO RELATED APPLICATIONS

This application claims benefit to U.S. 63/189,396 filed 2021 May 17.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

Knifes enclosures represent a long known advancement in the arts of knife making. The ability to selectively enclose a blade enables users to safely store, pocket, and transport a knife without accidentally harming oneself or others. Safely storing a blade within an enclosure however, also requires that the blade can be removed for use of cleaning with minimal difficulty.

Blade enclosures at present are commonly one or more shell pieces screwed together to create a cavity within the enclosure for selectively storing the blade. Disassembly of the enclosure is, in this case, careful work.

Knife users must first acquire a screwdriver, carefully remove screws from the enclosure, keep track of the screws while pulling apart the enclosure parts, and removing the enclosure from the blade without accidentally cutting oneself in the process. Further complicating the process, it is typical for a knife user to only disassembly a knife when it is experiencing a malfunction such as debris within the enclosure which prevents the blade from deploying for use.

Accordingly, one objective of the current system is to enable a simplified disassembly and assembly procedure where it comes to knife maintenance. Another is to alleviate the need to carry around tools for the purpose of disassembling a blade enclosure. Still another is to limit self harm due to accidental blade mishandling. And finally, to eliminate the need for small fasteners such as screws in the assembly of blade enclosures.

No prior art is known to the Applicant. However, the following references comprise examples of relevant blade enclosures: 5303474, 4139939, and U.S. Pat. No. 7,155,829.

BRIEF SUMMARY OF THE INVENTION

A blade enclosure for selectively releasing and securing a first shell portion and a second shell portion of a shell together with a fastener. Said blade enclosure comprises said shell, said fastener and a blade cavity. Said shell comprises said first shell portion and said second shell portion. Said blade cavity comprises a space between said first shell portion and said second shell portion. Said blade enclosure comprises a centerline, a first end and a second end. Said fastener is configured to selectively attach to said shell along said centerline. Said fastener is configured to further comprise a threaded shaft, and said shell comprises a fastener socket. Said fastener socket is partially in said second shell portion and partially in said first shell portion, such that when said shell is in an assembled configuration, said fastener socket is configured to receive said threaded shaft and hold said first shell portion and said second shell portion together. One or more guide pins and one or more guide pin sockets are aligned with one another at a pin angle. Said pin angle comprises a non-perpendicular angle relative to an interface plane between said first shell portion and said second shell portion. Said pin angle is non-parallel to said centerline. Said pin angle is configured to lean toward said first end and said fastener. Said shell comprises a front end and a rear end. A clip is configured to selectively attach to said rear end of said shell, and a blade is selectively extended from said front end. A portion of said clip is configured to slide through a clip slot, proximate to said rear end. Said clip slot comprises a clip slot width.

Said blade enclosure for selectively releasing and securing said first shell portion and said second shell portion of said shell together with said fastener. Said blade enclosure comprises said shell, said fastener and said blade cavity. Said shell comprises said first shell portion and said second shell portion. Said blade cavity comprises a space between said first shell portion and said second shell portion. Said blade enclosure comprises said centerline, said first end and said second end. Said fastener is configured to selectively attach to said shell along said centerline. Said fastener is configured to further comprise said threaded shaft, and said shell comprises said fastener socket. Said fastener socket is partially in said second shell portion and partially in said first shell portion, such that when said shell is in an assembled configuration, said fastener socket is configured to receive said threaded shaft and hold said first shell portion and said second shell portion together. Said blade enclosure further comprising said one or more guide pins and said one or more guide pin sockets. Said one or more guide pins is attached to a portion of said first shell portion and said one or more guide pin sockets is a portion of said second shell portion. Said one or more guide pins and said one or more guide pin sockets are configured to selectively attach to one another to secure said first shell portion to said second shell portion. Said one or more guide pins and said one or more guide pin sockets can further comprise a tab on a male guide portion and a tab slot on a female guide portion. Said second shell portion and said first shell portion are configured to attach to one another by aligning a portion of said male guide portion with said female guide portion, inserting said male guide portion into said female guide portion, sliding said male guide portion such that said tab becomes lodged into said tab slot.

Said blade enclosure for selectively releasing and securing said first shell portion and said second shell portion of said shell together with said fastener. Said blade enclosure comprises said shell, said fastener and said blade cavity. Said shell comprises said first shell portion and said second shell portion. Said blade cavity comprises a space between said first shell portion and said second shell portion. Said blade enclosure comprises said centerline, said first end and said second end. Said fastener is configured to selectively attach to said shell along said centerline. Said fastener is configured to further comprise said threaded shaft, and said shell comprises said fastener socket. Said fastener socket is partially in said second shell portion and partially in said first shell portion, such that when said shell is in an assembled configuration, said fastener socket is configured to receive said threaded shaft and hold said first shell portion and said second shell portion together.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
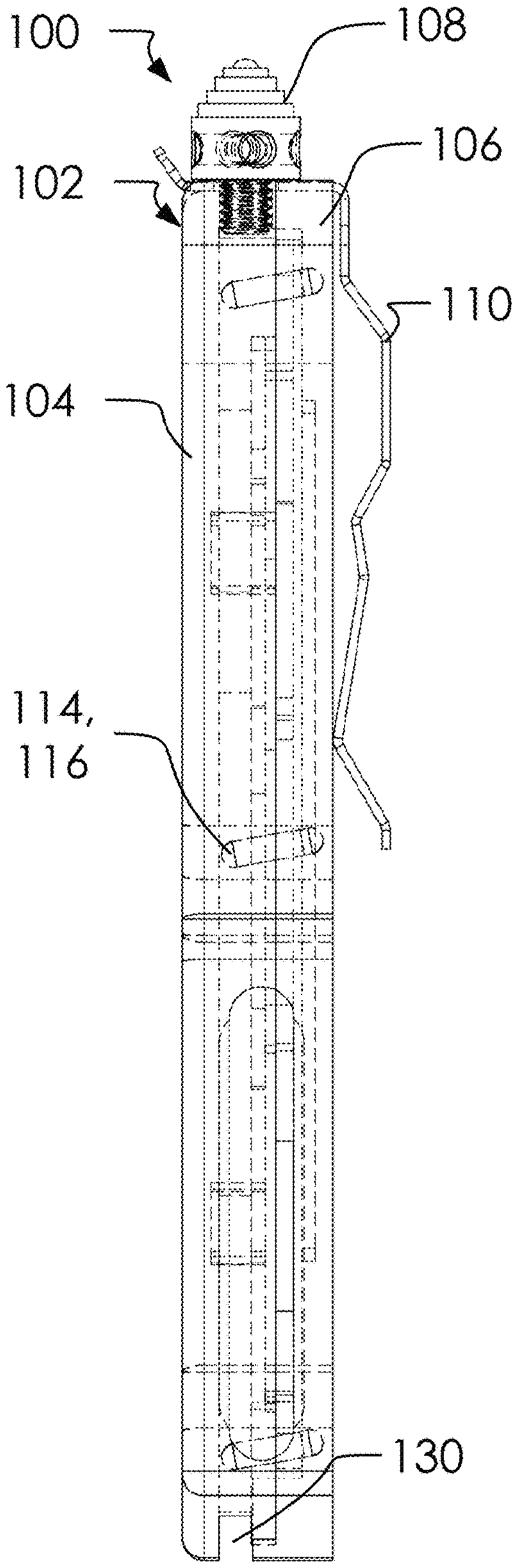
FIGS. 1A, and 1B illustrate an elevated side and top view of a blade enclosure 100.
Figure 1B:
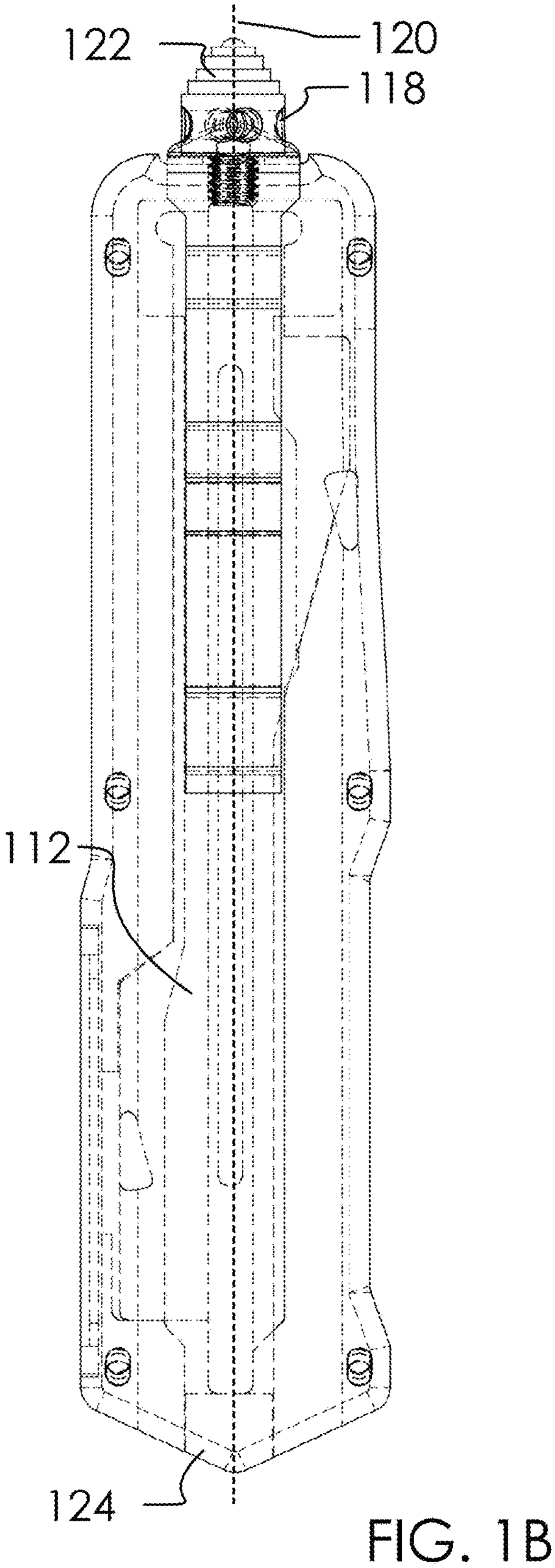

FIGS. 1A, and 1B illustrate an elevated side and top view of a blade enclosure 100.

In one embodiment, said blade enclosure 100 can comprise a shell 102 having a first shell portion 104 and a second shell portion 106, a fastener 108, and a clip 110. In one embodiment, said fastener 108 can comprise a compression screw, thumb screw, or even machine screw. In one embodiment, said clip 110 can attach to said shell 102, as is known in the art.

Within said shell 102, said blade enclosure 100 can comprise a blade cavity 112.

Said blade enclosure 100 can comprise one or more guide pins 114 and one or more guide pin sockets 116. In one embodiment, said one or more guide pins 114 can be attached to or a portion of said first shell portion 104 and said one or more guide pin sockets 116 can be a portion of said second shell portion 106.

As is known in the art, knives comprising two shell portions (such as said first shell portion 104 and said second shell portion 106) configured to selectively attached to one another using a plurality of screws, commonly 3 machine screws).

One advantage of said blade enclosure 100 over the prior art can comprise the inclusion of said fastener 108, said one or more guide pins 114 and/or said one or more guide pin sockets 116. By simplifying the process of assembly and disassembly of said blade enclosure 100, a knife user can more easily clean and repair said blade enclosure 100, whether in a shop or in the field. In one embodiment, said fastener 108 can be removed by hand.

In one embodiment, said fastener 108 can comprise one or more apertures 118 which can assist with providing leverage on said fastener 108 for attachment or removal.

In one embodiment, said blade enclosure 100 can comprise a centerline 120 as between a first end 122 and a second end 124. In one embodiment, said fastener 108 can selectively attach to said shell 102 along said centerline 120. Said second end of said blade enclosure can comprise an aperture 130.

Figure 2:
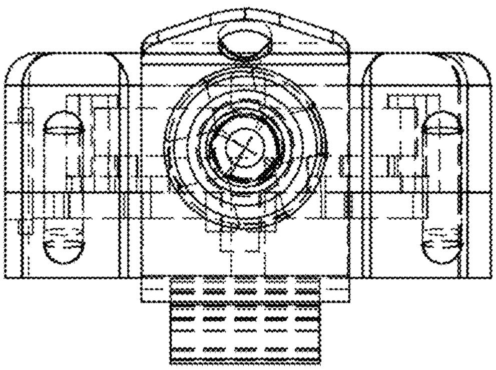
FIG. 2 illustrates an elevated end view of said blade enclosure 100.

FIG. 2 illustrates an elevated end view of said blade enclosure 100.

Figure 3:
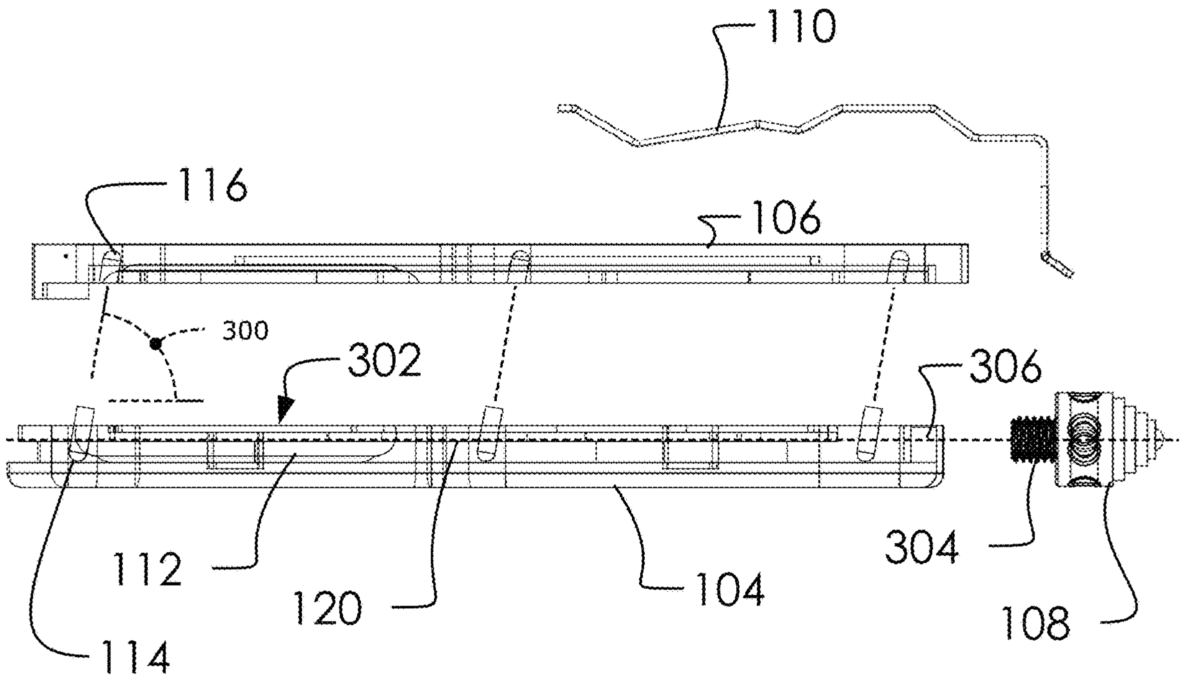
FIG. 3 illustrates an elevated side view of said blade enclosure 100 in an exploded configuration.

FIG. 3 illustrates an elevated side view of said blade enclosure 100 in an exploded configuration.

In one embodiment, said one or more guide pins 114 and said one or more guide pin sockets 116 can be aligned with one another at a pin angle 300, as illustrated. In one embodiment, said pin angle 300 can comprise a non-perpendicular angle relative to an interface plane 302 between said first shell portion 104 and said second shell portion 106. Likewise, said pin angle 300 can be non-parallel to said centerline 120. In one embodiment, said pin angle 300 can lean toward said first end 122 and said fastener 108.

In one embodiment, said fastener 108 can further comprise a threaded shaft 304, and said shell 102 can comprise a fastener socket 306. In one embodiment, said fastener socket 306 can be partially in said second shell portion 106 and partially in said first shell portion 104, such that when said shell 102 is in an assembled configuration, said fastener socket 306 can receive said threaded shaft 304 and hold said first shell portion 104 and said second shell portion 106 together.

In one embodiment, with said one or more guide pins 114 and said one or more guide pin sockets 116 being attached to one another at said pin angle 300 and said threaded shaft 304 with said fastener socket 306 preventing movement along said centerline 120, said shell 102 can be held together with said fastener 108. Accordingly, said blade enclosure 100 can be securely and selectively held together with one fastener, rather than a plurality.

Figures 4A, 4B:
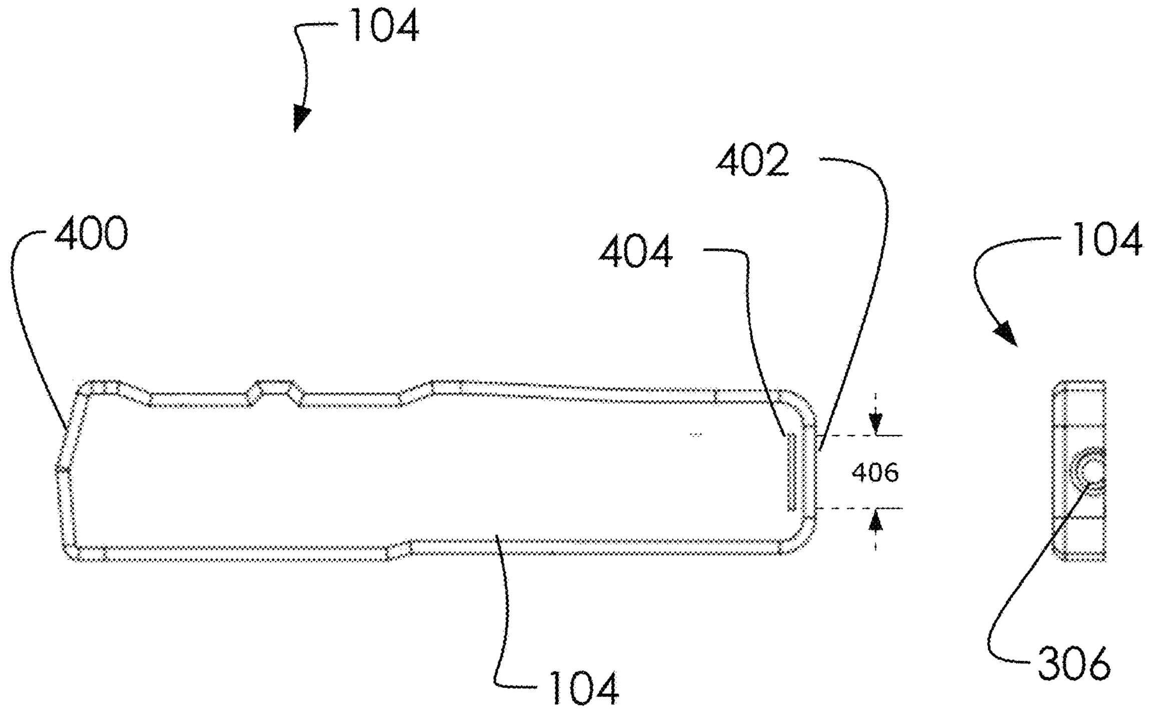
FIGS. 4A and 4B illustrate an elevated bottom and side view of a first shell portion 104.

FIGS. 4A and 4B illustrate an elevated bottom and side view of said first shell portion 104.

In one embodiment, said shell 102 can comprise a front end 400 and a rear end 402. In one embodiment, said clip 110 can be selectively attached to said rear end 402 of said shell 102, and a blade can be selectively extended from said front end 400. In one embodiment, a portion of said clip 110 can slide through a clip slot 404, proximate to said rear end 402. Said clip slot 404 can comprise a clip slot width 406. Said front end 400 of said shell 102 can comprise said aperture 130 configured to allow said blade to selectively extend from said front end 400.

Figure 5A:
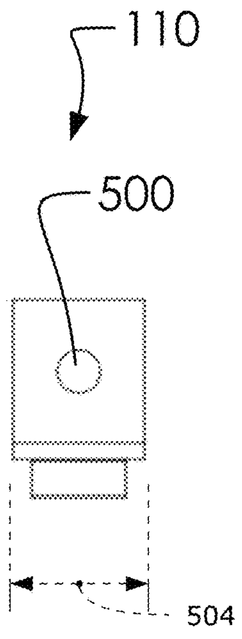
FIGS. 5A and 5B illustrate an elevated top and side view of a clip 110.
Figure 5B:
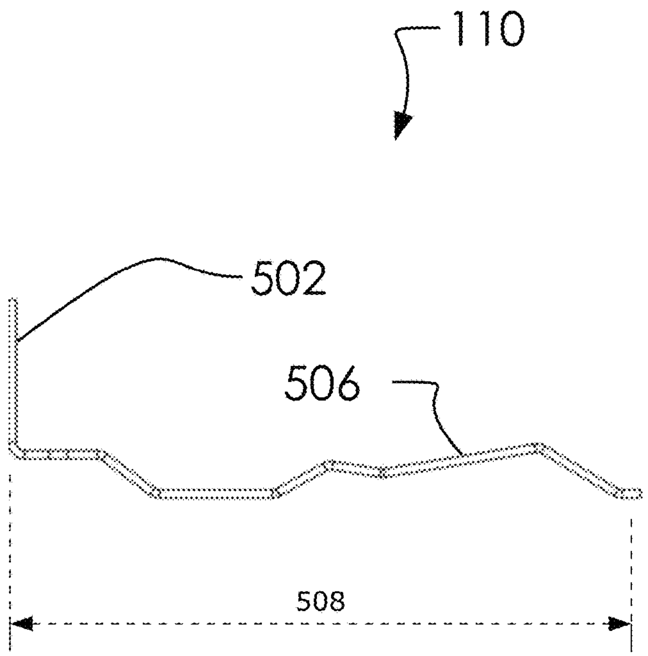

FIGS. 5A and 5B illustrate an elevated top and side view of said clip 110.

In one embodiment, said clip 110 can comprise a pin aperture 500 in a head portion 502, a head portion width 504, a clipping portion 506, and a clip length 508.

In one embodiment, said head portion width 504 can be smaller than said clip slot width 406. In one embodiment, said head portion 502 can be configured to selectively slide through a portion of said shell 102, such as said clip slot 404. Wherein, a portion of said fastener 108 can slide through said pin aperture 500 and secure said clip 110 to said shell 102.

For example, in one embodiment, with said head portion 502 of said clip 110 inserted into said clip slot 404, said pin aperture 500 can align with said centerline 120, said threaded shaft 304 and or said fastener socket 306. Wherein, securing said threaded shaft 304 into said fastener socket 306 will cause a portion of said threaded shaft 304 to pass through said pin aperture 500 and thereby hold said clip 110 in said shell 102.

Figure 6A:
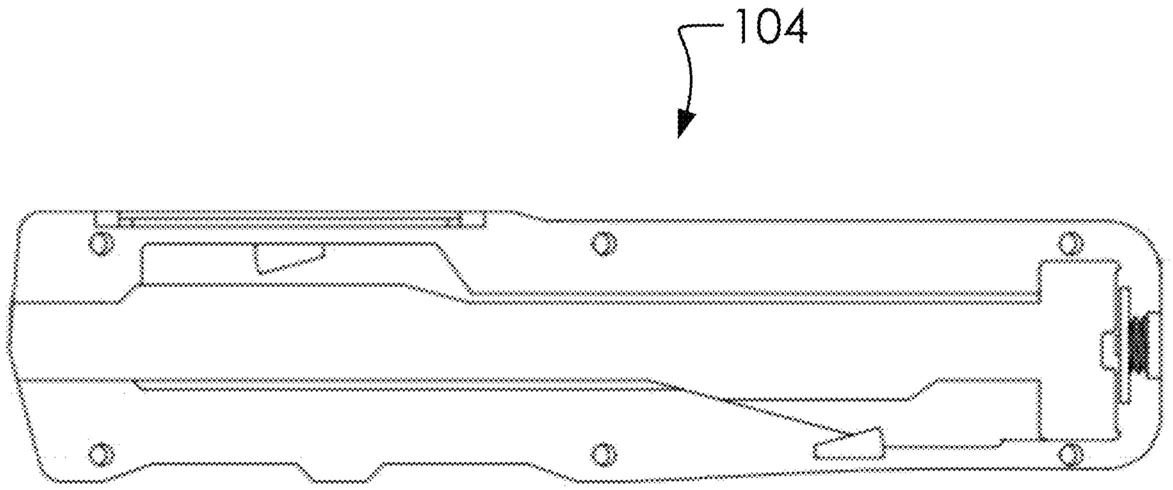
FIGS. 6A and 6B illustrate an elevated top view and cross-section side view of said first shell portion 104.
Figure 6B:
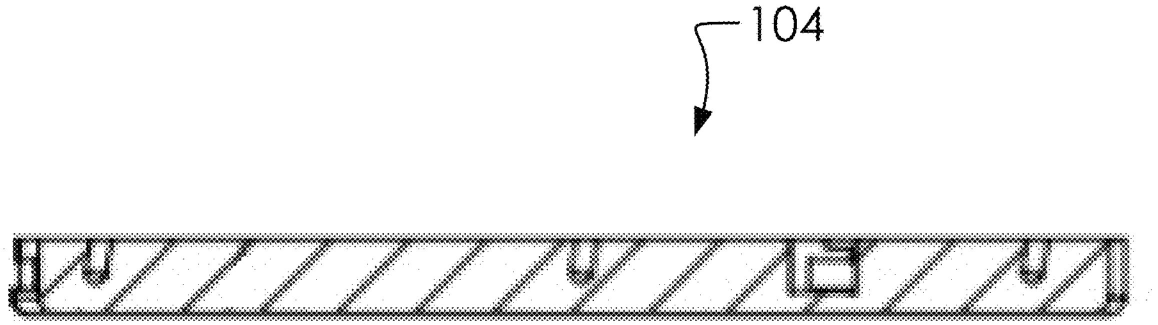

FIGS. 6A and 6B illustrate an elevated top view and cross-section side view of said first shell portion 104.

Figure 7A:
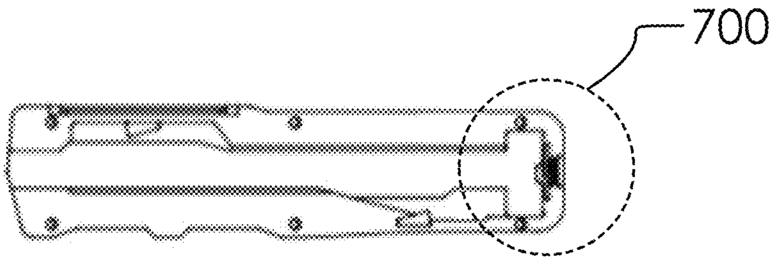
FIGS. 7A and 7B illustrate an elevated top view of said first shell portion 104 and a detailed view of a rear end 402 of said first shell portion 104.
Figure 7B:
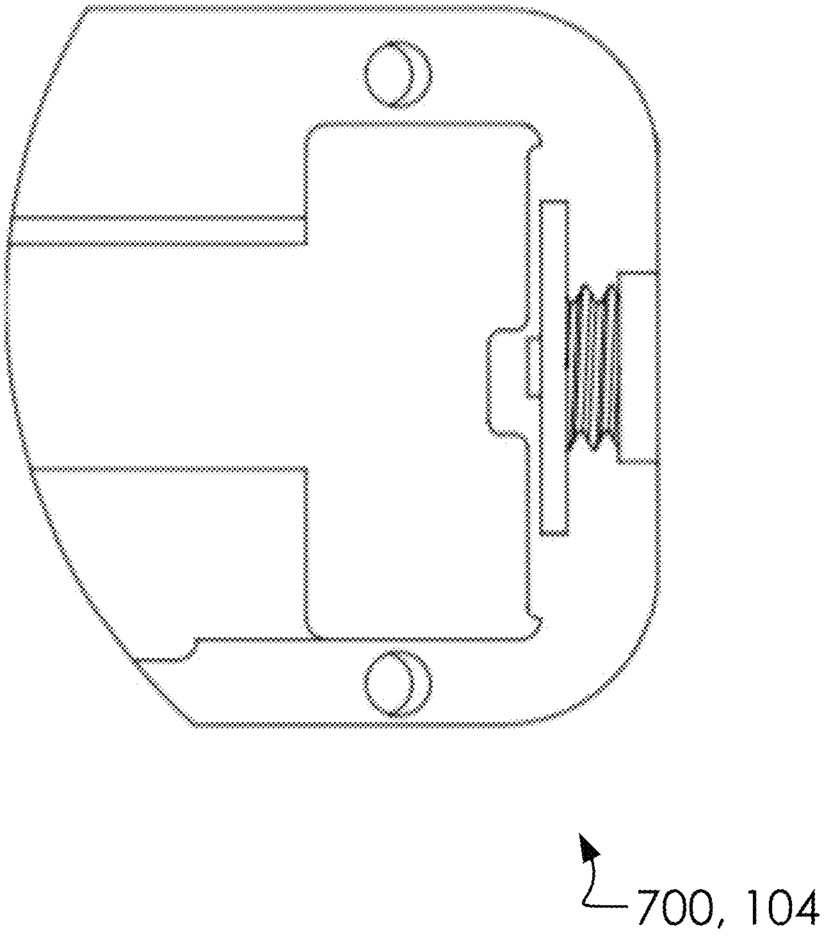

FIGS. 7A and 7B illustrate an elevated top view of said first shell portion 104 and a detailed view of said rear end 402 of said first shell portion 104.

As shown, FIG. 7B comprises a detailed portion of FIG. 7A at a callout 700.

As noted above, a portion of said clip 110 can algin with a portion of said fastener socket 306.

Figure 8A:
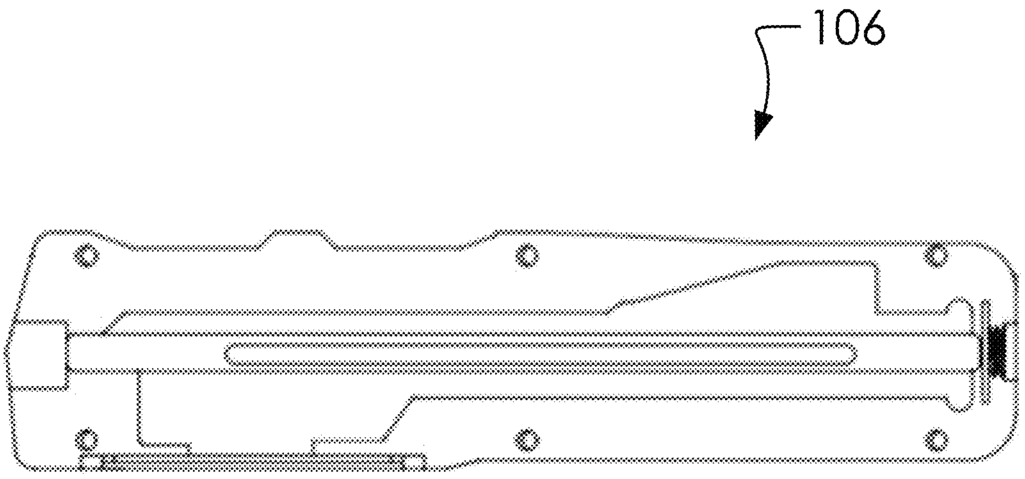
FIGS. 8A and 8B illustrate an elevated bottom view and cross-section side view of a second shell portion 106.
Figure 8B:
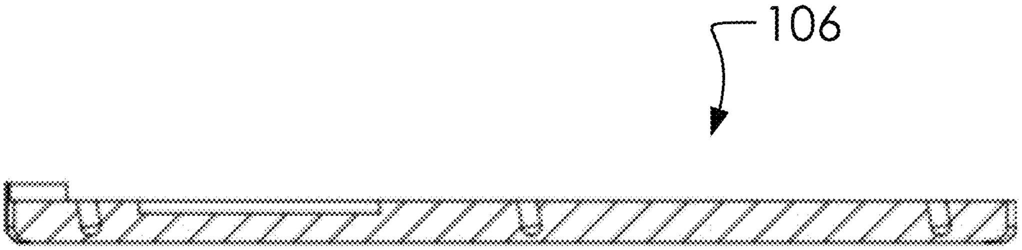

FIGS. 8A and 8B illustrate an elevated bottom view and cross-section side view of said second shell portion 106.

Figure 9A:
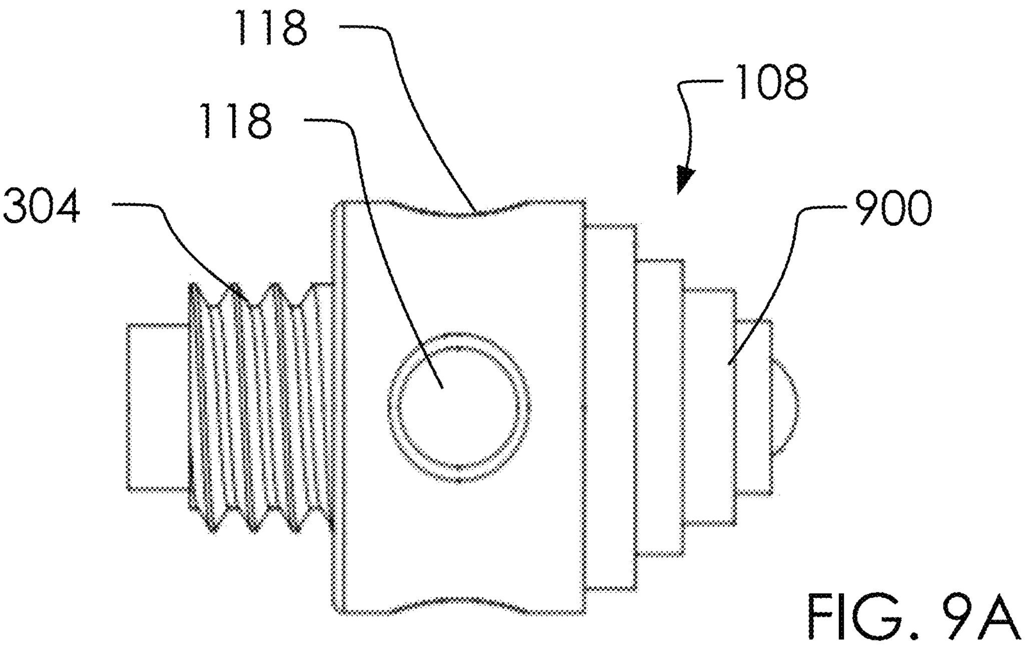
FIGS. 9A and 9B illustrate an elevated side view and perspective overview of a fastener 108.
Figure 9B:
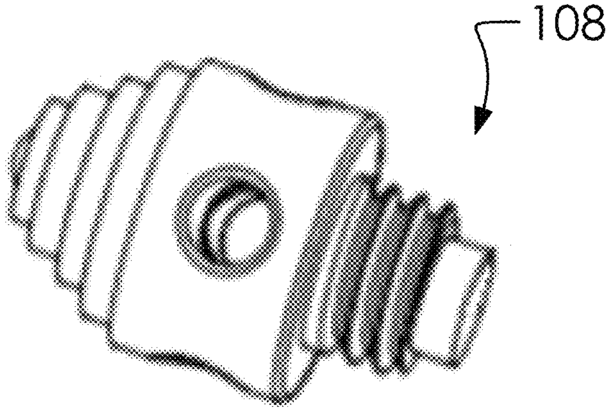

FIGS. 9A and 9B illustrate an elevated side view and perspective overview of said fastener 108.

In another embodiment, said fastener 108 can comprise a standard machine screw, wherein, said blade enclosure 100 comprises the advantage of using only one screw instead of a plurality of screws, as previously known.

In one embodiment, said fastener 108 can comprise said one or more apertures 118 which can assist with providing leverage on said fastener 108 for attachment or removal.

In one embodiment, said fastener 108 can comprise a glass breaker tip 900 at one end and said threaded shaft 304 at another end.

Figure 10A:
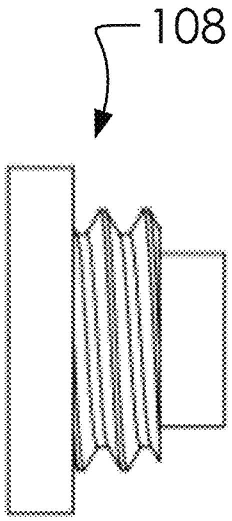
FIGS. 10A and 10B illustrate an elevated side view and a perspective overview of said fastener 108 without a glass breaker tip 900.
Figure 10B:
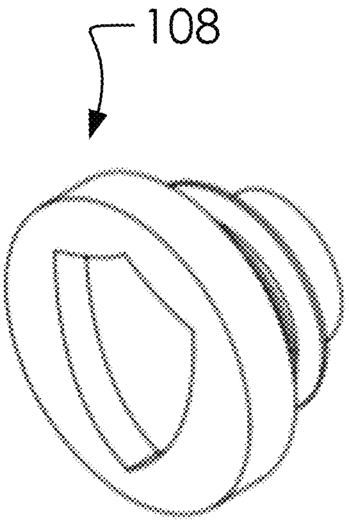

FIGS. 10A and 10B illustrate an elevated side view and a perspective overview of said fastener 108 without said glass breaker tip 900.

Figure 11:
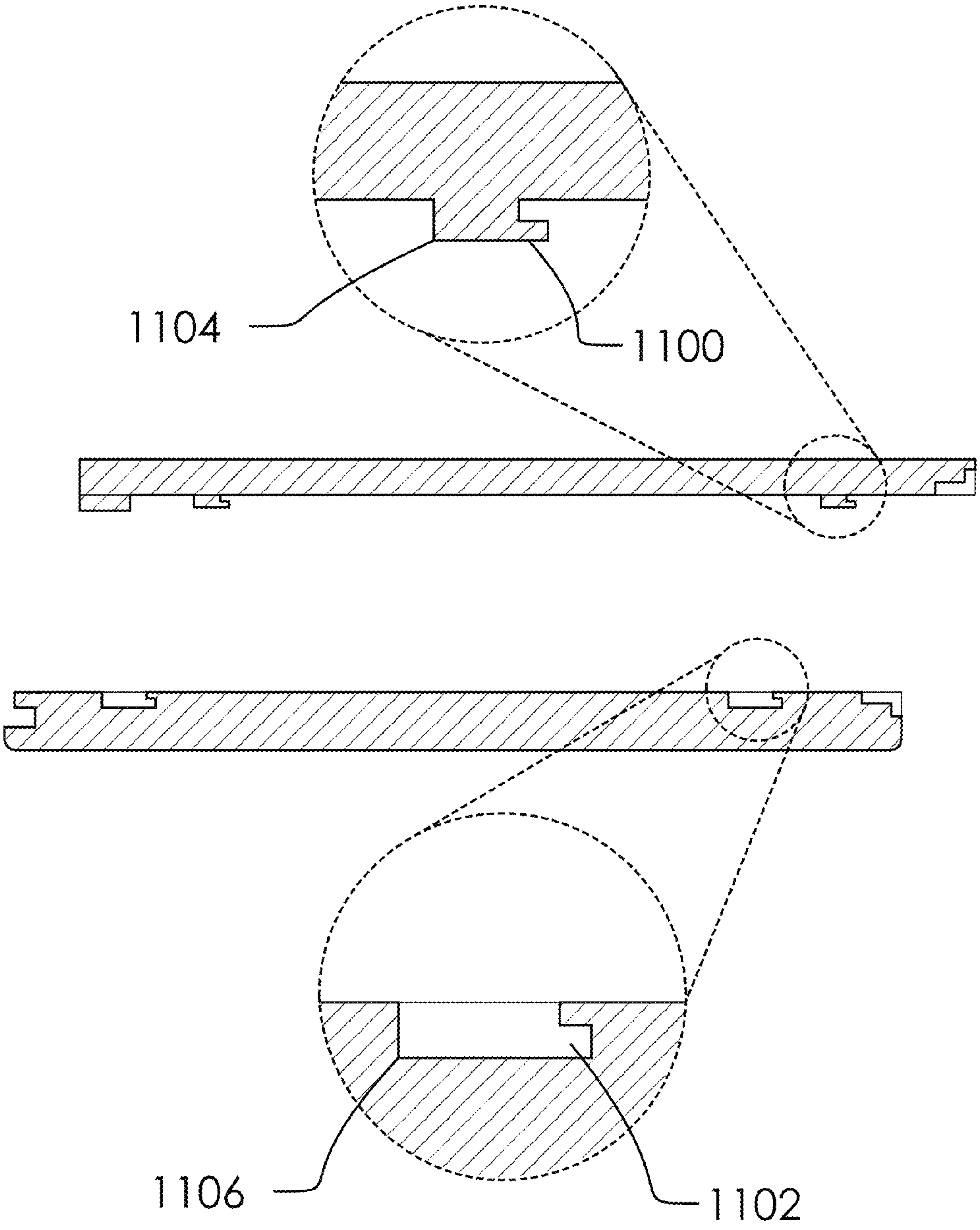
FIG. 11 illustrates an elevated cross-section side view of said blade enclosure 100.

FIG. 11 illustrates an elevated cross-section side view of said blade enclosure 100.

In one embodiment, said one or more guide pins 114, and said one or more guide pin sockets 116 can further comprise a tab 1100 on a male guide portion 1104 and a tab slot 1102 on a female guide portion 1106. Wherein, said shell 102 and said first shell portion 104 are configured to attach to one another by aligning a portion of said male guide portion 1104 with said female guide portion 1106, inserting 1said first shell portion 104 into 1said second shell portion 106, sliding said male guide portion 1104 such that said tab 1100 becomes lodged into said tab slot 1102.

Figure 12A:
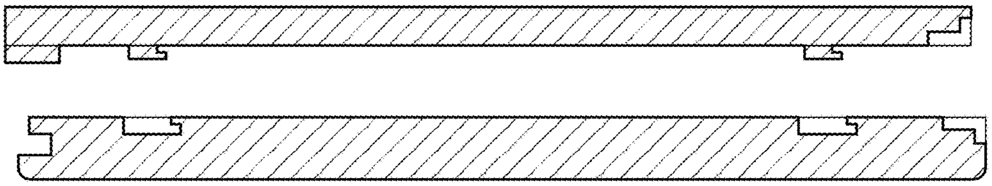
FIGS. 12A, 12B and 12C illustrate an elevated cross-section side view of said blade enclosure 100 with a shell 102 aligned with said first shell portion 104, a male guide portion 1104 inserted into a female guide portion 1106, and said shell 102 and said first shell portion 104 secured to one another.
Figure 12B:
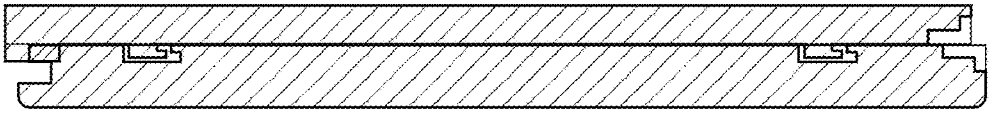
Figure 12C:
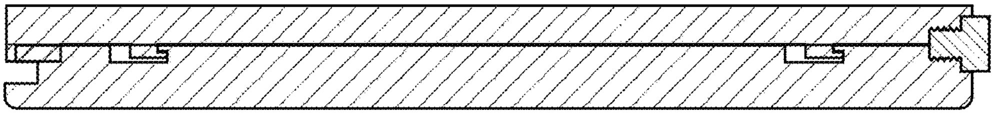

FIGS. 12A, 12B and 12C illustrate an elevated cross-section side view of said blade enclosure 100 with said shell 102 aligned with said first shell portion 104, said male guide portion 1104 inserted into said female guide portion 1106, and said shell 102 and said first shell portion 104 secured to one another.

In one embodiment, said shell 102 can be secured to said first shell portion 104 by attaching said male guide portion 1104 to said female guide portion 1106 and attaching said fastener 108 to said blade enclosure 100 at said fastener socket 306.

Figure 13:
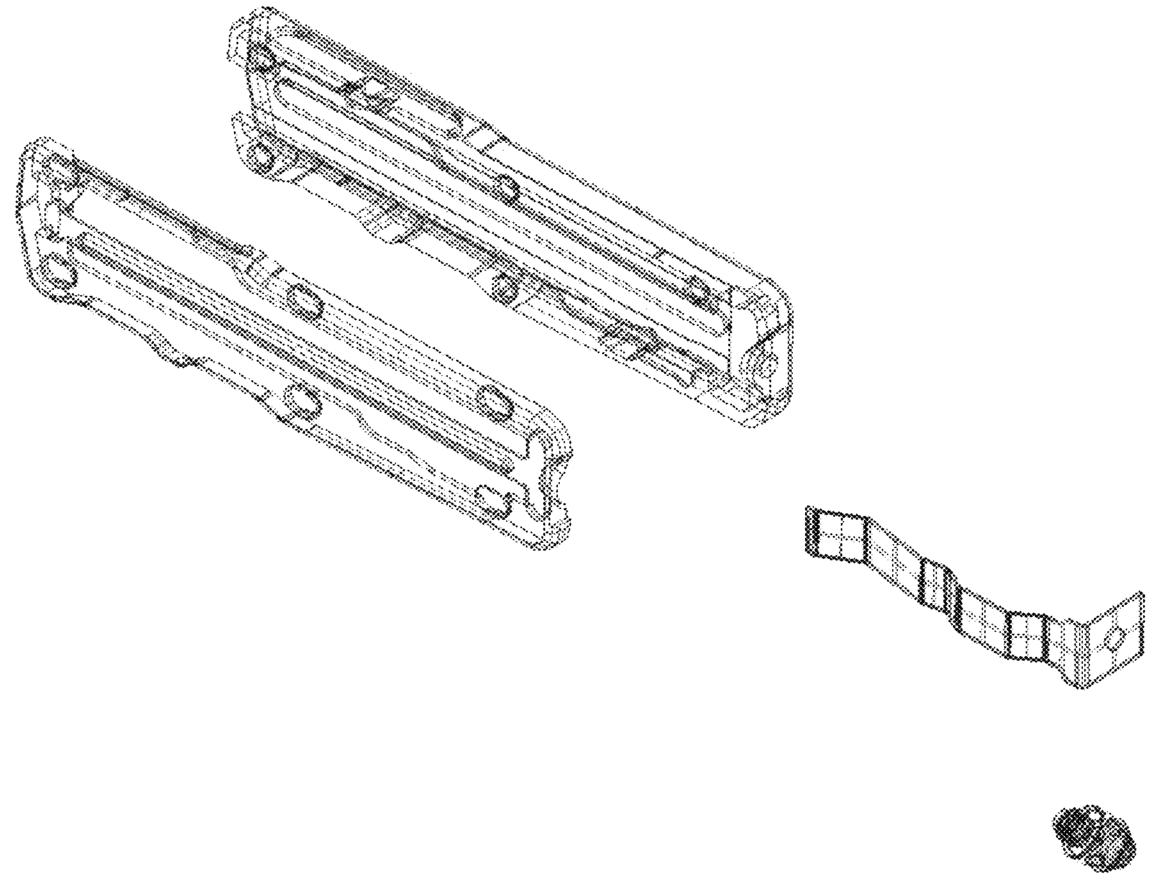
FIGS. 13 and 14 illustrate perspective overviews of said blade enclosure 100 with said male guide portion 1104 and said female guide portion 1106.
Figure 14A:
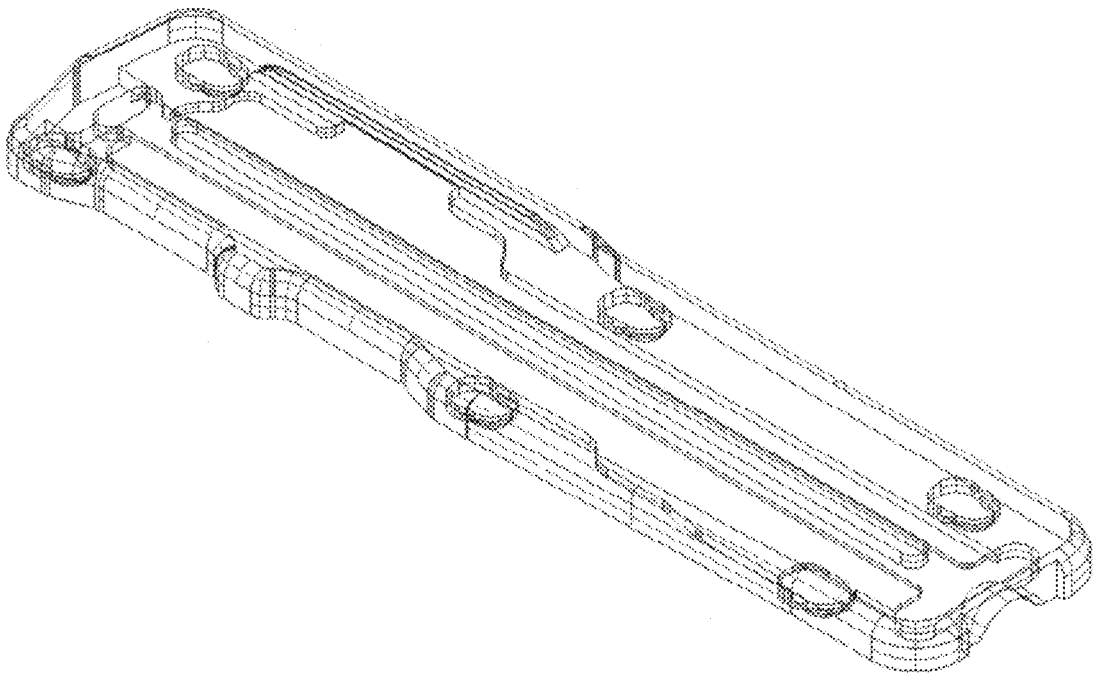
Figure 14B:
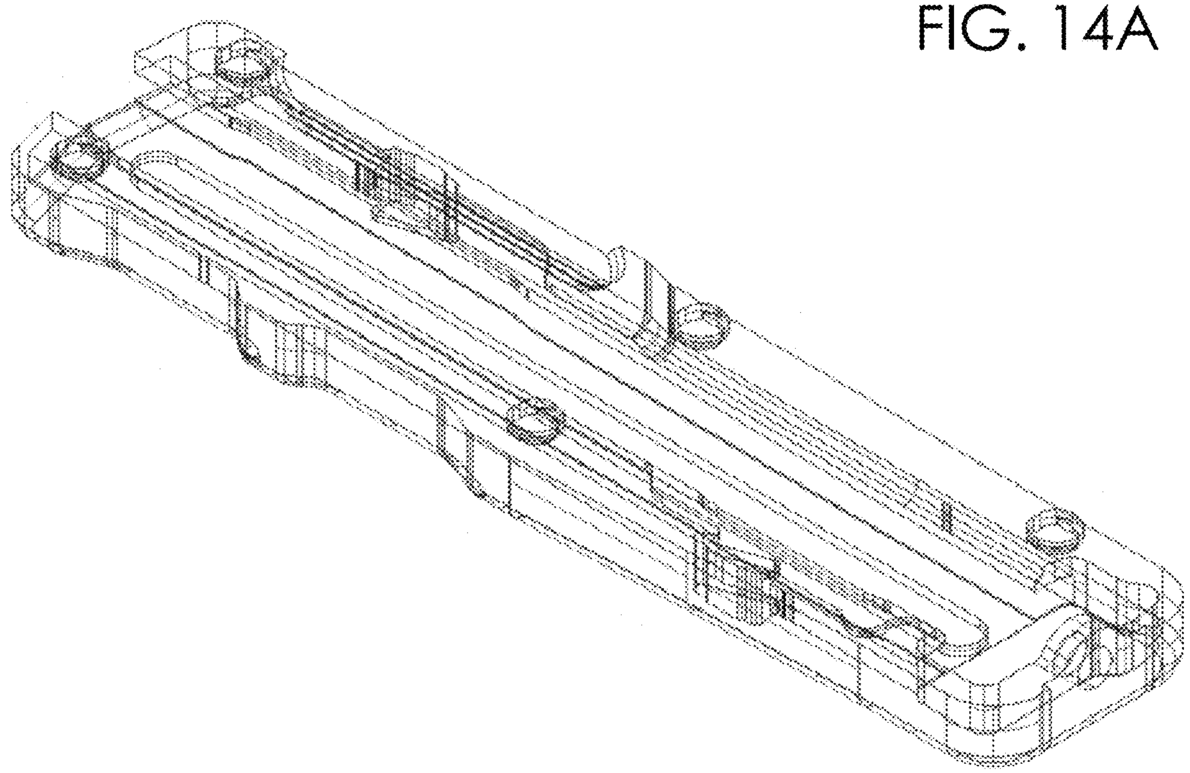

FIGS. 13 and 14 illustrate perspective overviews of said blade enclosure 100 with said male guide portion 1104 and said female guide portion 1106.

Parts List:

said blade enclosure 100,
Said shell 102,
Said first shell portion 104,
Said second shell portion 106,
Said fastener 108,
Said clip 110,
Said blade cavity 112,
Said one or more guide pins 114,
Said one or more guide pin sockets 116,
Said one or more apertures 118,
Said centerline 120,
Said first end 122,
Said second end 124,
Said pin angle 300,
Said interface plane 302,
Said threaded shaft 304,
Said fastener socket 306,
Said front end 400,
Said rear end 402,
Said clip slot 404,
Said clip slot width 406,
Said pin aperture 500,
Said head portion 502,
Said head portion width 504,
Said clipping portion 506,
Said clip length 508,
Said callout 700,
Said glass breaker tip 900,
Said tab 1100,
Said tab slot 1102,
Said male guide portion 1104 and
said female guide portion 1106.

The following comprises a summary of the claims to ensure completeness of the specification:

Said blade enclosure 100 for selectively releasing and securing said first shell portion 104 and said second shell portion 106 of said shell 102 together with said fastener 108. Said blade enclosure 100 comprises said shell 102, said fastener 108 and said blade cavity 112. Said shell 102 comprises said first shell portion 104 and said second shell portion 106. Said blade cavity 112 comprises a space between said first shell portion 104 and said second shell portion 106. Said blade enclosure 100 comprises said centerline 120, said first end 122 and said second end 124. Said fastener 108 can be configured to selectively attach to said shell 102 along said centerline 120. Said fastener 108 can be configured to further comprise said threaded shaft 304, and said shell 102 comprises said fastener socket 306. Said fastener socket 306 can be partially in said second shell portion 106 and partially in said first shell portion 104, such that when said shell 102 can be in an assembled configuration, said fastener socket 306 can be configured to receive said threaded shaft 304 and hold said first shell portion 104 and said second shell portion 106 together. Said blade enclosure 100 further comprising said one or more guide pins 114 and said one or more guide pin sockets 116. Said one or more guide pins 114 can be attached to a portion of said first shell portion 104 and said one or more guide pin sockets 116 can be a portion of said second shell portion 106. Said one or more guide pins 114 and said one or more guide pin sockets 116 can be configured to selectively attach to one another so as to secure said first shell portion 104 to said second shell portion 106. Said one or more guide pins 114, and said one or more guide pin sockets 116 can further comprise said tab 1100 on said male guide portion 1104 and said tab slot 1102 on said female guide portion 1106. Said second shell portion 106 and said first shell portion 104 can be configured to attach to one another by aligning a portion of said male guide portion 1104 with said female guide portion 1106, inserting said male guide portion 1104 into said female guide portion 1106, sliding said male guide portion 1104 such that said tab 1100 becomes lodged into said tab slot 1102.

Said blade enclosure 100 for selectively releasing and securing said first shell portion 104 and said second shell portion 106 of said shell 102 together with said fastener 108. Said blade enclosure 100 comprises said shell 102, said fastener 108 and said blade cavity 112. Said shell 102 comprises said first shell portion 104 and said second shell portion 106. Said blade cavity 112 comprises a space between said first shell portion 104 and said second shell portion 106. Said blade enclosure 100 comprises said centerline 120, said first end 122 and said second end 124. Said fastener 108 can be configured to selectively attach to said shell 102 along said centerline 120. Said fastener 108 can be configured to further comprise said threaded shaft 304, and said shell 102 comprises said fastener socket 306. Said fastener socket 306 can be partially in said second shell portion 106 and partially in said first shell portion 104, such that when said shell 102 can be in an assembled configuration, said fastener socket 306 can be configured to receive said threaded shaft 304 and hold said first shell portion 104 and said second shell portion 106 together. Said blade enclosure 100 further comprising said one or more guide pins 114 and said one or more guide pin sockets 116. Said one or more guide pins 114 can be attached to a portion of said first shell portion 104 and said one or more guide pin sockets 116 can be a portion of said second shell portion 106. Said one or more guide pins 114 and said one or more guide pin sockets 116 can be configured to selectively attach to one another to secure said first shell portion 104 to said second shell portion 106. Said one or more guide pins 114, and said one or more guide pin sockets 116 can further comprise said tab 1100 on said male guide portion 1104 and said tab slot 1102 on said female guide portion 1106. Said second shell portion 106 and said first shell portion 104 can be configured to attach to one another by aligning a portion of said male guide portion 1104 with said female guide portion 1106, inserting said male guide portion 1104 into said female guide portion 1106, sliding said male guide portion 1104 such that said tab 1100 becomes lodged into said tab slot 1102.

Said blade enclosure 100 for selectively releasing and securing said first shell portion 104 and said second shell portion 106 of said shell 102 together with said fastener 108. Said blade enclosure 100 comprises said shell 102, said fastener 108 and said blade cavity 112. Said shell 102 comprises said first shell portion 104 and said second shell portion 106. Said blade cavity 112 comprises a space between said first shell portion 104 and said second shell portion 106. Said blade enclosure 100 comprises said centerline 120, said first end 122 and said second end 124. Said fastener 108 can be configured to selectively attach to said shell 102 along said centerline 120. Said fastener 108 can be configured to further comprise said threaded shaft 304, and said shell 102 comprises said fastener socket 306. Said fastener socket 306 can be partially in said second shell portion 106 and partially in said first shell portion 104, such that when said shell 102 can be in an assembled configuration, said fastener socket 306 can be configured to receive said threaded shaft 304 and hold said first shell portion 104 and said second shell portion 106 together.

Said blade enclosure 100 further comprising said one or more guide pins 114 and said one or more guide pin sockets 116. Said one or more guide pins 114 can be attached to a portion of said first shell portion 104 and said one or more guide pin sockets 116 can be a portion of said second shell portion 106. Said one or more guide pins 114 and said one or more guide pin sockets 116 can be configured to selectively attach to one another to secure said first shell portion 104 to said second shell portion 106.

Said one or more guide pins 114, and said one or more guide pin sockets 116 can further comprise said tab 1100 on said male guide portion 1104 and said tab slot 1102 on said female guide portion 1106.

Said second shell portion 106 and said first shell portion 104 can be configured to attach to one another by aligning a portion of said male guide portion 1104 with said female guide portion 1106, inserting said male guide portion 1104 into said female guide portion 1106, and sliding said male guide portion 1104 such that said tab 1100 becomes lodged into said tab slot 1102.

Said shell 102 can be secured to said first shell portion 104 by attaching said male guide portion 1104 to said female guide portion 1106 and attaching said fastener 108 to said blade enclosure 100 at said fastener socket 306.

Said one or more guide pins 114 and said one or more guide pin sockets 116 can be aligned with one another at said pin angle 300. Said pin angle 300 comprises a non-perpendicular angle relative to said interface plane 302 between said first shell portion 104 and said second shell portion 106. Said pin angle 300 can be non-parallel to said centerline 120.

Said pin angle 300 can be configured to lean toward said first end 122 and said fastener 108.

Said shell 102 comprises said front end 400 and said rear end 402. Said clip 110 can be configured to selectively attach to said rear end 402 of said shell 102, and a blade can be selectively extended from said front end 400.

A portion of said clip 110 can be configured to slide through said clip slot 404, proximate to said rear end 402. Said clip slot 404 comprises said clip slot width 406.

Said clip 110 comprises said pin aperture 500 in said head portion 502, said head portion width 504, said clipping portion 506, and said clip length 508. Said head portion width 504 can be smaller than said clip slot width 406. Said head portion 502 can be configured to selectively slide through a portion of said shell 102, such as said clip slot 404. A portion of said fastener 108 can be configured to slide through said pin aperture 500 and secure said clip 110 to said shell 102.

with said head portion 502 of said clip 110 inserted into said clip slot 404, said pin aperture 500 can be configured to align with said centerline 120, said threaded shaft 304 and or said fastener socket 306. securing said threaded shaft 304 into said fastener socket 306 will cause a portion of said threaded shaft 304 to pass through said pin aperture 500 and thereby hold said clip 110 in said shell 102.

Said fastener 108 comprises said glass breaker tip 900 at one end and said threaded shaft 304 at another end.

Said blade enclosure 100 for selectively releasing and securing said first shell portion 104 and said second shell portion 106 of said shell 102 together with said fastener 108. Said blade enclosure 100 comprises said shell 102, said fastener 108 and said blade cavity 112. Said shell 102 comprises said first shell portion 104 and said second shell portion 106. Said blade cavity 112 comprises a space between said first shell portion 104 and said second shell portion 106. Said blade enclosure 100 comprises said centerline 120, said first end 122 and said second end 124. Said fastener 108 can be configured to selectively attach to said shell 102 along said centerline 120. Said fastener 108 can be configured to further comprise said threaded shaft 304, and said shell 102 comprises said fastener socket 306. Said fastener socket 306 can be partially in said second shell portion 106 and partially in said first shell portion 104, such that when said shell 102 can be in an assembled configuration, said fastener socket 306 can be configured to receive said threaded shaft 304 and hold said first shell portion 104 and said second shell portion 106 together. Said one or more guide pins 114 and said one or more guide pin sockets 116 can be aligned with one another at said pin angle 300. Said pin angle 300 comprises a non-perpendicular angle relative to said interface plane 302 between said first shell portion 104 and said second shell portion 106. Said pin angle 300 can be non-parallel to said centerline 120. Said pin angle 300 can be configured to lean toward said first end 122 and said fastener 108. Said shell 102 comprises said front end 400 and said rear end 402. Said clip 110 can be configured to selectively attach to said rear end 402 of said shell 102, and a blade can be selectively extended from said front end 400. A portion of said clip 110 can be configured to slide through said clip slot 404, proximate to said rear end 402. Said clip slot 404 comprises said clip slot width 406.

Said clip 110 comprises said pin aperture 500 in said head portion 502, said head portion width 504, said clipping portion 506, and said clip length 508. Said head portion width 504 can be smaller than said clip slot width 406. Said head portion 502 can be configured to selectively slide through a portion of said shell 102, such as said clip slot 404. A portion of said fastener 108 can be configured to slide through said pin aperture 500 and secure said clip 110 to said shell 102.

With said head portion 502 of said clip 110 inserted into said clip slot 404, said pin aperture 500 can be configured to align with said centerline 120, said threaded shaft 304 and or said fastener socket 306. securing said threaded shaft 304 into said fastener socket 306 will cause a portion of said threaded shaft 304 to pass through said pin aperture 500 and thereby hold said clip 110 in said shell 102.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein.".

The invention claimed is:

1. A blade enclosure for selectively releasing and securing a first shell portion and a second shell portion of a shell together with a fastener, wherein:

said blade enclosure comprises said shell, said fastener and a blade cavity;

said shell comprises said first shell portion and said second shell portion;

said blade cavity comprises a space between said first shell portion and said second shell portion;

said blade enclosure comprises a centerline, a first end and a second end;

said first shell portion and said second shell portion share an interface plane when in an assembled configuration being aligned with said centerline;

said fastener is configured to selectively attach to said shell along said centerline;

said fastener comprises a threaded shaft;

said shell comprises a fastener socket; said fastener socket is partially in said second shell portion and partially in said first shell portion, such that when said shell is in an assembled configuration, said fastener socket is configured to receive said threaded shaft and hold said first shell portion and said second shell portion together;

said blade enclosure further comprises one or more guide pins and one or more guide pin sockets;

said one or more guide pins is attached to a portion of said first shell portion and said one or more guide pin sockets is a portion of said second shell portion;

said one or more guide pins and said one or more guide pin sockets are configured to selectively attach to one another to secure said first shell portion to said second shell portion;

said one or more guide pins and said one or more guide pin sockets are aligned with one another at a pin angle;

said pin angle comprises a non-perpendicular angle relative to an interface plane between said first shell portion and said second shell portion; and said pin angle is non-parallel to said centerline;

said blade enclosure is configured to remain in said assembled configuration with said fastener in said fastener socket to prevent movement along said center line of said first shell portion and said second shell portion, and said one or more guide pins assembled with said one or more guide pin sockets to prevent perpendicular movement of said first shell portion and said second shell portion relative said center line; and removing said fastener from said fastener socket allows said first shell portion and said second shell portion freedom to remove said one or more guide pins from said one or more guide pin sockets so as to disassembly said blade enclosure.

2. The blade enclosure of claim 1, wherein:

said pin angle is leaning toward said first end and said fastener.

3. The blade enclosure of claim 1, wherein:

said shell comprises a front end and a rear end;

a clip is configured to selectively attach to said rear end of said shell; and said front end comprises an aperture configured to allow a blade to selectively extend from said front end of said shell.

4. The blade enclosure of claim 3, wherein:

a portion of said clip is configured to slide through a clip slot, proximate to said rear end; and said clip slot comprises a clip slot width.

5. The blade enclosure of claim 4, wherein:

said clip comprises a pin aperture in a head portion, a head portion width, a clipping portion, and a clip length;

said head portion width is smaller than said clip slot width;

said head portion is configured to selectively slide through a portion of said shell, such as said clip slot; and a portion of said fastener is configured to slide through said pin aperture and secure said clip to said shell.

6. The blade enclosure of claim 5, wherein:

with said head portion of said clip inserted into said clip slot, said pin aperture is configured to align with said centerline, said threaded shaft and or said fastener socket; and securing said threaded shaft into said fastener socket will cause a portion of said threaded shaft to pass through said pin aperture and thereby hold said clip in said shell.

7. The blade enclosure of claim 1, wherein:

said fastener comprises a glass breaker tip at one end and said threaded shaft at another end.

8. The blade enclosure of claim 1, wherein:

said shell comprises a front end and a rear end;

said front end comprises an aperture configured to allow a blade to selectively extend from said front end of said shell.

9. A blade enclosure for selectively releasing and securing a first shell portion and a second shell portion of a shell together with a fastener, wherein:

said blade enclosure comprises said shell, said fastener and a blade cavity;

said shell comprises said first shell portion and said second shell portion;

said blade cavity comprises a space between said first shell portion and said second shell portion;

said blade enclosure comprises a centerline, a first end and a second end;

said first shell portion and said second shell portion share an interface plane when in an assembled configuration being aligned with said centerline;

said fastener is configured to selectively attach to said shell along said centerline;

said fastener comprises a threaded shaft;

said shell comprises a fastener socket; said fastener socket is partially in said second shell portion and partially in said first shell portion, such that when said shell is in an assembled configuration, said fastener socket is configured to receive said threaded shaft and hold said first shell portion and said second shell portion together;

said first shell portion comprises at least one tab in said interface plane;

said at least one tab comprises a male guide portion;

said second shell portion comprises at least one tab slot in said interface plane;

said at least one tab slot comprises a female guide portion;

said at least one tab is configured to selectively attach to said at least one tab slot;

said blade enclosure is configured to remain in said assembled configuration with said fastener in said fastener socket to prevent movement along said center line of said first shell portion and said second shell portion, and said at least one tab attached to said at least one tab slot to prevent perpendicular movement of said first shell portion and said second shell portion relative said center line; and removing said fastener from said fastener socket allows said first shell portion and said second shell portion freedom to remove said at least one tab from said at least one tab slot to disassembly said blade enclosure.

10. The blade enclosure of claim 9, wherein:

said second shell portion and said first shell portion are configured to attach to one another by aligning a portion of said male guide portion with said female guide portion, inserting said male guide portion into said female guide portion, and sliding said male guide portion such that said tab becomes lodged into said tab slot.

11. The blade enclosure of claim 9, wherein:

said shell is secured to said first shell portion by attaching said male guide portion to said female guide portion and attaching said fastener to said blade enclosure at said fastener socket.

* * * * *